US010731502B2

(12) United States Patent
Ackermann et al.

(10) Patent No.: US 10,731,502 B2
(45) Date of Patent: Aug. 4, 2020

(54) HIGH PRESSURE COMPRESSOR ROTOR THERMAL CONDITIONING USING OUTER DIAMETER GAS EXTRACTION

(71) Applicant: UNITED TECHNOLOGIES CORPORATION, Hartford, CT (US)

(72) Inventors: William K. Ackermann, East Hartford, CT (US); Matthew P. Forcier, South Windsor, CT (US); Paul J. Hiester, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1209 days.

(21) Appl. No.: 14/877,965

(22) Filed: Oct. 8, 2015

(65) Prior Publication Data

US 2016/0123176 A1 May 5, 2016

Related U.S. Application Data

(60) Provisional application No. 62/074,112, filed on Nov. 3, 2014.

(51) Int. Cl.
*F02C 6/08* (2006.01)
*F01D 17/10* (2006.01)
(Continued)

(52) U.S. Cl.
CPC ............. *F01D 17/10* (2013.01); *F01D 5/02* (2013.01); *F01D 5/08* (2013.01); *F01D 5/081* (2013.01);
(Continued)

(58) Field of Classification Search
CPC ...... F02C 7/08; F02C 9/18; F02C 6/08; F01D 5/81; F01D 5/82; F01D 5/08; F01D 11/254
See application file for complete search history.

(56) References Cited

U.S. PATENT DOCUMENTS 4,576,547 A * 3/1986 Weiner .................... F01D 11/24
415/116
4,893,984 A * 1/1990 Davison ................... F01D 11/24
415/116
(Continued)

FOREIGN PATENT DOCUMENTS

EP 0077265 A1 4/1983
EP 0141770 A1 * 5/1985 ............. F01D 11/24
EP 0141770 B1 * 5/1987 ............. F01D 11/24

OTHER PUBLICATIONS

European Search Report for European Application No. 15192455.2 dated Mar. 23, 2016.

*Primary Examiner* — Gerald L Sung
*Assistant Examiner* — Marc J Amar
(74) *Attorney, Agent, or Firm* — Carlson, Gaskey & Olds, P.C.

(57) ABSTRACT

A compressor for use in a gas turbine engine comprises a compressor rotor including blades and a disc, with a bore defined radially inwardly of the disc. A radially outer housing surrounds an outer diameter of the blades. A lower pressure tap and a higher pressure tap tap air from two distinct locations within the compressor and radially outwardly through the outer housing. A valve selectively delivers at least one of the lower pressure tap and the higher pressure tap to the bore of the disc. A control for the valve is programmed to move the valve to a position delivering the higher pressure tap at a point prior to take-off when the compressor is mounted in a gas turbine engine on an aircraft. A gas turbine engine and a method of operating a gas turbine engine are also disclosed.

10 Claims, 3 Drawing Sheets

(51) Int. Cl.
    *F01D 5/02*          (2006.01)
    *F01D 25/24*        (2006.01)
    *F02C 3/06*          (2006.01)
    *F01D 5/08*          (2006.01)
    *F04D 27/02*        (2006.01)
    *F01D 25/08*        (2006.01)
    *F02C 9/18*          (2006.01)

(52) U.S. Cl.
    CPC ............. *F01D 5/082* (2013.01); *F01D 25/08* (2013.01); *F01D 25/24* (2013.01); *F02C 3/06* (2013.01); *F02C 6/08* (2013.01); *F02C 9/18* (2013.01); *F04D 27/023* (2013.01); *F04D 27/0223* (2013.01); *F05D 2220/32* (2013.01); *F05D 2240/20* (2013.01); *F05D 2270/312* (2013.01); *Y02T 50/676* (2013.01)

(56) References Cited

U.S. PATENT DOCUMENTS

| | | | |
|---|---|---|---|
| 2011/0236179 A1* | 9/2011 | Rog | F01D 11/24 415/1 |
| 2013/0192239 A1* | 8/2013 | Glahn | F01D 25/18 60/772 |
| 2013/0280028 A1 | 10/2013 | Benjamin et al. | |
| 2014/0219794 A1* | 8/2014 | Yilmaz | F02C 7/12 416/1 |
| 2015/0252683 A1* | 9/2015 | Hasting | F01D 11/24 60/782 |
| 2015/0345405 A1* | 12/2015 | Schwarz | F01D 5/08 60/782 |
| 2016/0208712 A1* | 7/2016 | Schwarz | F02C 3/04 |

* cited by examiner

HIGH PRESSURE COMPRESSOR ROTOR THERMAL CONDITIONING USING OUTER DIAMETER GAS EXTRACTION

CROSS-REFERENCE TO RELATED APPLICATION

This application claims priority to U.S. Provisional Patent Application No. 62/074,112, filed Nov. 3, 2014.

BACKGROUND OF THE INVENTION

This application relates to extracting compressed air for thermal conditioning of a high pressure compressor rotor.

Gas turbine engines used on aircraft typically include a fan delivering air into a bypass duct and into a compressor section. Air from the compressor is passed downstream into a combustion section where it is mixed with fuel and ignited. Products of this combustion pass downstream over turbine rotors driving them to rotate.

Turbine rotors drive compressor and fan rotors. Historically, the fan rotor was driven at the same speed as a turbine rotor. More recently, it has been proposed to include a gear reduction between the fan rotor and a fan drive turbine. With this change, the diameter of the fan has increased dramatically and a bypass ratio or volume of air delivered into the bypass duct compared to a volume delivered into the compressor has increased. With this increase in bypass ratio, it becomes more important to efficiently utilize the air that is delivered into the compressor.

One factor that increases the efficiency of the use of this air is to have a higher pressure at the exit of a high pressure compressor. This high pressure results in a high temperature increase. The temperature at the exit of the high pressure compressor is known as $T_3$ in the art.

There is a stress challenge to increasing $T_3$ on a steady state basis due largely to material property limits called "allowable stress" at a given maximum $T_3$ level. At the maximum, a further increase in a design $T_3$ presents challenges to achieve a goal disk life. In particular, as the design $T_3$ is elevated, transient stresses in the disk increases. This is true since the radially outer portions of a high pressure compressor rotor (i.e., the blades and outermost surfaces of the disk or blisk), which are in the path of air, see an increased heat rapidly during a rapid power increase. Such an increase occurs, for example, when the pilot increases power during a take-off roll. However, a rotor disk bore does not see the increased heat as immediately. Thus, there are severe stresses due to the thermal gradient between the disk bore and the outer rim region.

Thermal gradient challenges are greatest during large changes in power setting. For instance, from idle to take-off, cruise to decent, etc. It is possible that the thermal stress in the disk is much greater than the stress due to the centrifugal force on the disk. The engine has typically been at low speed or idle as the aircraft waits on the ground and then, just before take-off, the speed of the engine is increased dramatically. Disk thermal gradient stresses may result in a compressor design that cannot achieve desired pressures ($P_3$, and temperature).

SUMMARY OF THE INVENTION

In a featured embodiment, a compressor for use in a gas turbine engine comprises a compressor rotor including blades and a disc, with a bore defined radially inwardly of the disc. A radially outer housing surrounds an outer diameter of the blades. A lower pressure tap and a higher pressure tap tap air from two distinct locations within the compressor and radially outwardly through the outer housing. A valve selectively delivers at least one of the lower pressure tap and the higher pressure tap to the bore of the disc. A control for the valve is programmed to move the valve to a position delivering the higher pressure tap at a point prior to take-off when the compressor is mounted in a gas turbine engine on an aircraft.

In another embodiment according to the previous embodiment, the valve delivers the lower pressure tap to the bore of the disc at high power settings, including take-off.

In another embodiment according to any of the previous embodiments, air is delivered through a strut downstream of the valve and into the bore of the disc.

In another embodiment according to any of the previous embodiments, air is delivered from the strut radially inward of the disc and communicates with a downstream most portion of the disc.

In another embodiment according to any of the previous embodiments, air is delivered through a strut downstream of the valve and into the bore of the disc.

In another embodiment according to any of the previous embodiments, air is delivered from the strut radially inward of the disc and communicates with a downstream most portion of the disc.

In another embodiment according to any of the previous embodiments, the air communicates with a downstream most portion of the disc.

In another featured embodiment, a gas turbine engine comprises a compressor section, a combustor, and a turbine section. The compressor section includes a compressor rotor including blades and a disc, with a bore defined radially inwardly of the disc. A radially outer housing surrounds an outer diameter of the blades. A lower pressure tap and a higher pressure tap tap air from two distinct locations within the compressor section, and radially outwardly of the outer housing. A valve selectively delivers at least one of the lower pressure tap and the higher pressure tap to the bore of the disc. A control for the valve is programmed to move the valve to a position delivering the higher pressure tap at a point prior to take-off when engine compressor is mounted on an aircraft.

In another embodiment according to the previous embodiment, the valve delivers the lower pressure tap to the bore of the disc at high power settings, including take-off.

In another embodiment according to any of the previous embodiments, air is delivered through a strut downstream of the valve and into the bore of the disc.

In another embodiment according to any of the previous embodiments, air is delivered from the strut radially inward of the disc and communicates with a downstream most portion of the disc.

In another embodiment according to any of the previous embodiments, air is delivered through a strut downstream of the valve and into the bore of the disc.

In another embodiment according to any of the previous embodiments, air is delivered from the strut radially inward of the disc and communicates with a downstream most portion of the disc.

In another embodiment according to any of the previous embodiments, the air communicates with a downstream most portion of the disc.

In another featured embodiment, a method of operating a gas turbine engine includes the steps of tapping a lower pressure air tap and a higher pressure air tap from two distinct locations within a compressor and radially outwardly of an outer housing, and selectively delivering at least one of the lower pressure tap and the higher pressure tap to a bore of a compressor rotor disc. The higher pressure tap is delivered to the bore prior to an associated aircraft on which the gas turbine engine is mounted, moving to take-off and climb conditions.

In another embodiment according to the previous embodiments, including the step of delivering the lower pressure tap to the bore of the disc at high power settings including take-off.

In another embodiment according to any of the previous embodiments, including the step of delivering the tapped air through a strut and into the bore of the disc.

In another embodiment according to any of the previous embodiments, including the step of delivering air from the strut radially inward of the disc and to a downstream most portion of the disc.

In another embodiment according to any of the previous embodiments, including the step of delivering the tapped air through a strut and into the bore of the disc.

In another embodiment according to any of the previous embodiments, including the step of delivering air to a downstream most portion of the disc.

These and other features may be best understood from the following drawings and specification.

DETAILED DESCRIPTION

Figure 1:
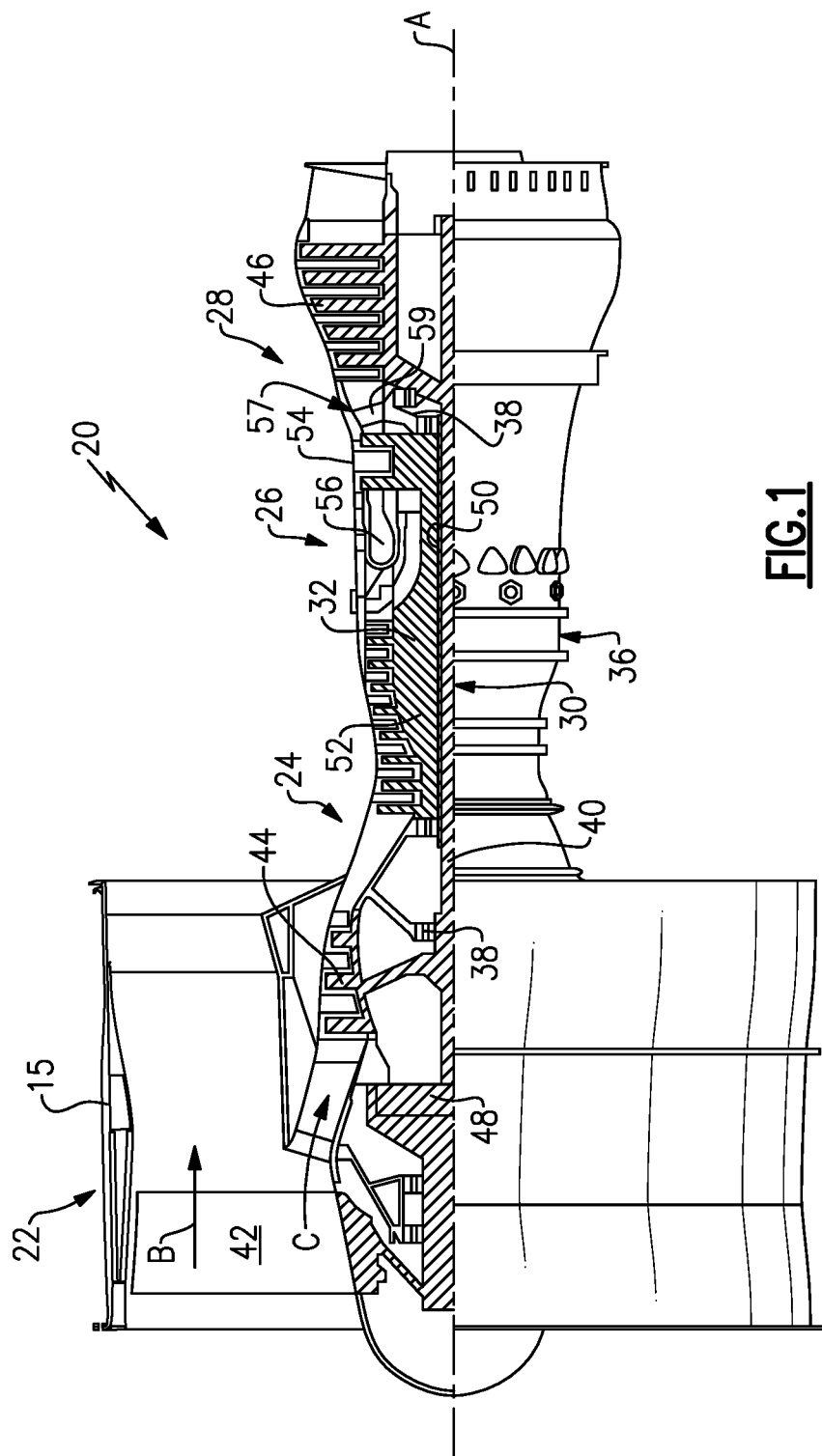
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 meters/second).

Figure 2:
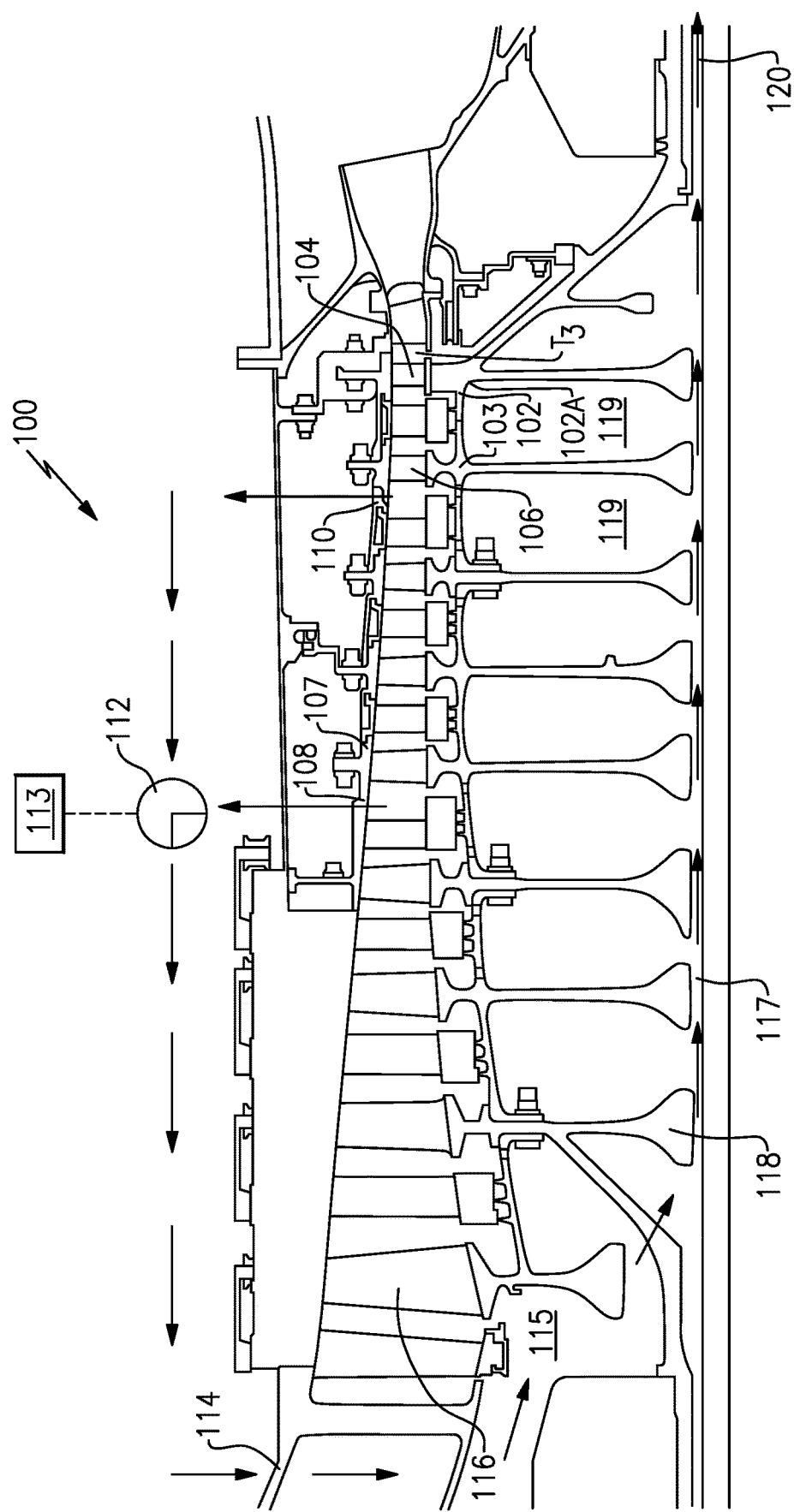
FIG. 2 shows details of a compressor section in a first condition.

FIG. 2 shows a high pressure compressor section 100. While a number of stages are illustrated, this disclosure focuses on the most downstream stages. Hubs or discs 102 and 103 are shown mounting a pair of blades 104 and 106. As known, a temperature $T_3$ is defined downstream of an end blade 104. As mentioned above, it is desirable to increase the $T_3$, however, there are real world challenges in doing so. In particular, the temperatures of the compressed air being moved by the blades 104 and 106 heats the outer peripheral portions (including the blades) of the high pressure compressor 100 much more rapidly than bores 102A of the disc 102 heat. This can cause challenges as mentioned above.

In the past, air has been tapped from the compressor stages radially inwardly through the disc at upstream locations and delivered to preheat the downstream areas, such as bores of the discs 102 and 103. However, tapping the air radially inwardly through the hub decreases the pressure and, thus, the efficiency of the preheating. This becomes particularly acute as one moves to more downstream locations, such as the discs 102 and 103.

This disclosure taps compressed air from locations radially outwardly through an outer housing 107. Thus, taps 108 and 110 extend through the outer housing 107 at two distinct locations in the high pressure compressor 100. The tap 108 is shown to be at a lower pressure location than the tap 110. Both taps pass through a valve 112 controlled by a controller 113. Downstream of the valve 112, the tapped air passes through a strut 114 and into a chamber 115 at a location upstream of the upstream most blade 116 of the high pressure compressor. This air passes into a chamber 115 and then radially inwardly along a path 117 radially inward of an innermost surface 118 of the high pressure compressor 100. The air passing along path 117 is at a relatively high pressure still and, thus, provides good preheating to inner chambers 119 within the bores defined by the discs 102 and 103. Thus, the challenges mentioned above in the prior art are reduced.

FIG. 2 shows the valve 112 in a location to communicate the lower pressure tap 108 into the chamber 115. This position is generally used at high power settings.

Figure 3:
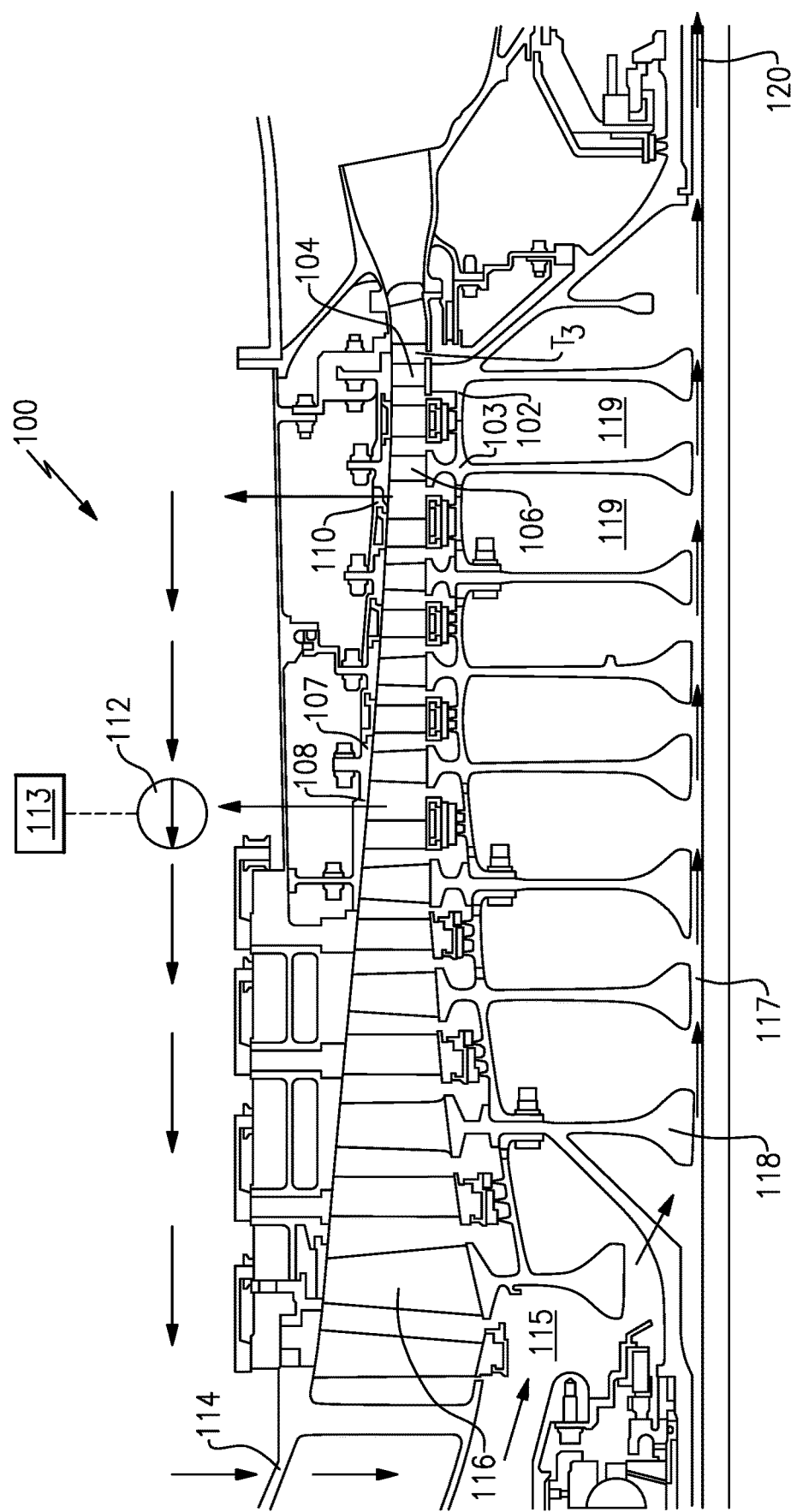
FIG. 3 shows the FIG. 2 compressor in a second operational condition.

At some lower power settings, such as at idle just before the aircraft is moving toward takeoff and climb, the valve 112 is moved to the position shown in FIG. 3. As is well known, idle is a condition wherein an aircraft associated with the engine is one the ground. Controller 113 is programmed to control the movement of the valve 112. In this position, higher temperature air from the tap 110 is delivered to preheat the inner chambers 119. When the aircraft associated with the high pressure compressor 100 begins to move towards the most challenging times, such as takeoff and climb, the temperature gradient across the last compressor stages is reduced due to this preheating.

As shown at 120, after the air has preheated the disc bore 102, it passes downstream to provide cooling air for a turbine section (see FIG. 1). Since the air being tapped to the inner chambers 119 is at a higher pressure, the air at 120 will also be at a higher pressure, which will provide a greater amount of cooling capacity, and increase the efficiency of the overall engine.

During challenging times, and in particular, take-off and climb, the switch is moved to the FIG. 2 position to provide cooling. After the more challenging condition has ended, the valve 112 may be returned to the FIG. 3 position.

It should be understood that some modulation between the two airflows, and mixing, could be provided at either position. However, in general, the hotter air from the FIG. 3 position is the bulk of the air provided at a point in time just prior to take-off and climb.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A compressor for use in a gas turbine engine comprising:
   a compressor rotor including blades and a disc, with a bore defined radially inwardly of said disc, there being a radially outer housing surrounding an outer diameter of said blades;
   a lower pressure tap and a higher pressure tap for tapping aft from two distinct locations within said compressor and radially outwardly through said outer housing, and back radially inwardly through said outer housing and into said bore, and the air being delivered back radially inwardly through the outer housing at a location upstream of an upstream most blade row in said compressor rotor, and a valve for selectively delivering at least one of said lower pressure tap and said higher pressure tap to said bore of said disc; and
   a control for said valve being programmed to move said valve to a position delivering said higher pressure tap at a point prior to take-off when the compressor is mounted in gas turbine engine on an aircraft, and said point prior to take-off includes at least idle, when the aircraft associated with the gas turbine engine is on the ground, and said higher pressure tap aft being utilized to preheat the compressor disk prior to take-off; and
   wherein said valve delivers said lower pressure tap to said bore of said disc at high power settings, said high power settings including take-off.

2. The compressor as set forth in claim 1, wherein air is delivered through a strut downstream of said valve and into said bore of said disc.

3. The compressor as set forth in claim 2, wherein air is delivered from said strut radially inward of said disc and communicates with a downstream most portion of said disc.

4. The compressor as set forth in claim 1, wherein the air communicates with a downstream most portion of said disc.

5. The compressor as set forth in claim 1, wherein said compressor rotor is a high pressure compressor rotor.

6. A gas turbine engine comprising:
   a compressor rotor including blades and a disc, with a bore defined radially inwardly of said disc, there being a radially outer housing surrounding an outer diameter of said blades;
   a lower pressure tap and a higher pressure tap for tapping air from two distinct locations within said compressor and radially outwardly through said outer housing, and back radially inwardly through said outer housing and into said bore, and the air being delivered back radially inwardly through the outer housing at a location upstream of an upstream most-blade row in said compressor rotor, and a valve for selectively delivering at least one of said lower pressure tap and said higher pressure tap to said bore of said disc; and
   and a control for said valve being programmed to move said valve to a position delivering said higher pressure tap at a point prior to take-off when the compressor is mounted in the gas turbine engine on an aircraft, and said point prior to take-off includes at least idle, when the aircraft associated with the gas turbine engine is on the ground, and said higher pressure tap air being utilized to preheat the compressor disk prior to take-off; and wherein said valve delivers said lower pressure tap to said bore of said disc at high power settings, said high power settings including take-off.

7. The gas turbine engine as set forth in claim 6, wherein air is delivered through a strut downstream of said valve and into said bore of said disc.

8. The gas turbine engine as set forth in claim 7, wherein air is delivered from said strut radially inward of said disc and communicates with a downstream most portion of said disc.

9. The gas turbine engine as set forth in claim 6, wherein the air communicates with a downstream most portion of said disc.

10. The gas turbine engine as set forth in claim 6, wherein said compressor rotor is a high pressure compressor rotor.

* * * * *